United States Patent [19]

Norton et al.

[11] 3,726,281
[45] Apr. 10, 1973

[54] SELF-LUBRICATING CATHETER

[75] Inventors: William J. Norton, Berkeley Heights; Keith Ferguson, Rutherford, both of N.J.

[73] Assignee: C. R. Bard Inc., Murray Hill, N.J.

[22] Filed: Dec. 8, 1971

[21] Appl. No.: 205,827

[52] U.S. Cl. ............................................. 128/349 R
[51] Int. Cl. ........................................... A61m 25/00
[58] Field of Search .......................... 128/348–350

[56] References Cited

UNITED STATES PATENTS

| 2,845,930 | 8/1958 | Brown | 128/348 |
| 2,912,981 | 11/1959 | Keough | 128/349 B |
| 3,275,001 | 9/1966 | Rosecrans | 128/349 B |
| 3,345,988 | 10/1967 | Vitello | 128/349 R |
| 3,648,704 | 3/1972 | Jackson | 128/349 R |
| 3,683,928 | 8/1972 | Kuntz | 128/349 R |

Primary Examiner—Charles F. Rosenbaum
Attorney—W. Saxton Seward

[57] ABSTRACT

A urinary catheter provided with a lubrication lumen extending from an eye adjacent the distal tip to a reservoir adjacent the drainage funnel, with means for permitting, causing and controlling the flow of lubricant from the reservoir to the eye as the catheter is inserted into a patient.

8 Claims, 3 Drawing Figures

PATENTED APR 10 1973 3,726,281

INVENTORS
WILLIAM J. NORTON
KEITH FERGUSON
BY
ATTORNEY

SELF-LUBRICATING CATHETER

BACKGROUND OF THE INVENTION

In medical procedures which utilize urinary catheters it is often necessary or desirable to lubricate the catheter before it is inserted into the body. At the present time there are two basic procedures to provide catheter lubrication.

In the first method a packet of sterile lubricant is torn open and the content is squeezed onto the catheter surface. When the lubricant is applied to the catheter surface it becomes very awkward to handle both objects and properly place the lubricant while maintaining sterile conditions. After the lubricant is placed on the catheter tip, the area near the tip of the catheter must be grasped with a gloved hand to push the catheter into the urethra until it reaches the bladder. It is often difficult to get a satisfactory grip on the lubricated surface of the catheter.

The second procedure utilizes lubricant in a syringe. The lubricant is injected into the urethra before insertion of the catheter. This method involves the risk of forcing excessive quantities of lubricant up into the bladder where it may not be easily expelled. The excess lubricant in the bladder can, in time, harden with calcium deposits and become a source of extreme discomfort.

Alternative efforts to solve the problem of catheter lubrication are represented by the Walck et al. U.S. Pat. No. 3,556,294 and the references cited therein, namely, Vitello, U.S. Pat. No. 3,545,988 and Sheridan U.S. Pat. No. 3,169,527.

The present invention eliminates the need for additional materials and handling. The invention is a single use disposable unit which allows a minimum amount of lubricant to be released from the tip of the catheter as it is advanced into the body and along the length of the urethra. The surface of the catheter outside the body remains dry and easily grasped to push the catheter forward up into the bladder. Lubricant which has been pushed back at the entrance of the urethra during the initial catheter insertion serves to lubricate the catheter surface further back along the length of the catheter as it enters the urethra. The discharge of the lubricant from its reservoir is controlled by releasing a clamp and applying pressure to the reservoir as lubricant is needed. When the catheter is fully inserted, the reservoir may again be clamped off and any remaining lubricant can be left within the reservoir to be discarded with the catheter when it is withdrawn from the patient.

In order to manufacture a self-lubricating Foley catheter a standard irrigation Foley catheter with three separate lumens is modified in the following manner. First, a small flow restraining orifice is inserted into the irrigation funnel arm of the catheter. Without this orifice the lubricant would be expelled in too short a time period to allow control of the lubricant during the time required for complete insertion of the catheter. A clamp is positioned immediately behind the orifice at the funnel end of the irrigation arm and a valve is fitted in the end of the funnel. The chamber formed between the clamp and the valve can thus serve as a reservoir for the lubricant. After the assembly is complete, the reservoir is filled with three to five cubic centimeters of lubricant. The lubricant filled unit is then placed into an autoclave where the lubricant is sterilized. The entire unit is then packaged and gas sterilized as a ready-to-use product.

A practical embodiment of the invention is shown in the accompanying drawing, wherein.

Figure 1:
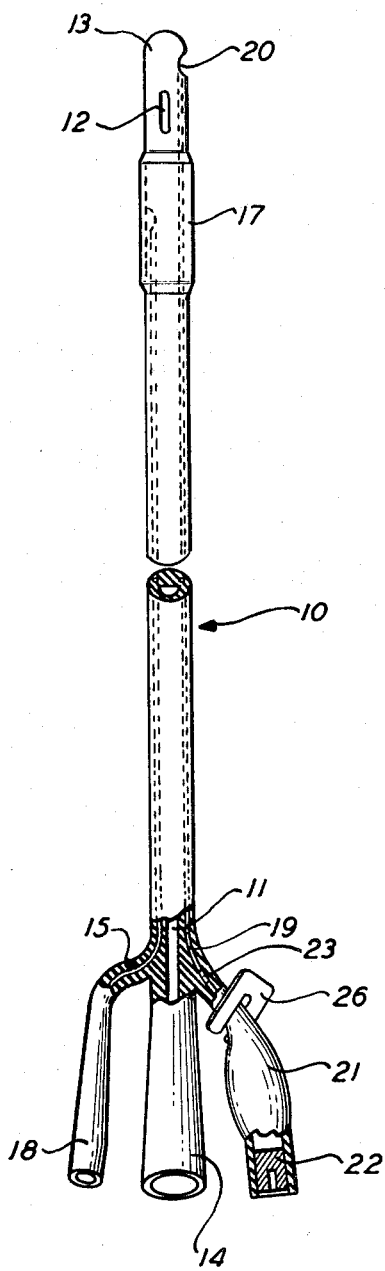
FIG. 1 represents an elevation of the catheter, parts being broken away and parts being shown in section.
Figure 2:
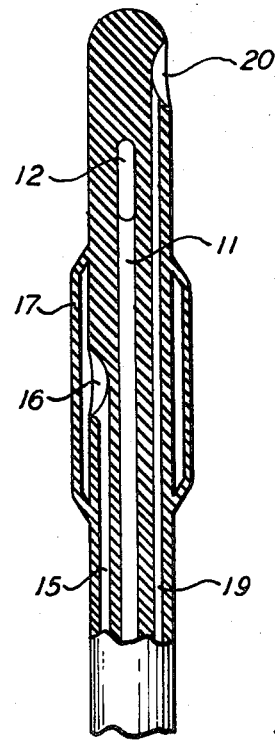
FIG. 2 represents an enlarged axial section of the distal end of the catheter.
Figure 3:
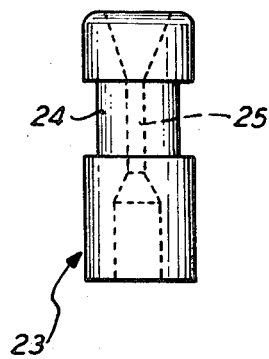
FIG. 3 represents an enlarged elevation of the flow restrainer.

Referring to the drawing, the catheter 10 is basically a three-lumen Foley irrigation and drainage catheter, having a drainage lumen 11 communicating with the eye 12 adjacent the distal tip 13 and terminating proximally in the funnel 14. The inflation lumen 15 communicates at 16 with the interior of the balloon 17 and terminates proximally in the inflation funnel 18 which may be open, as shown, or may be closed by a valve such as that shown in Garth U.S. Pat. No. 3,087,492.

The third lumen 19 extends from the eye 20, located as close as practicable to the tip 13 of the catheter, to the funnel 21 which is closed proximally by a Gilbert plug 22 of self-sealing material (or equivalent closure) and is also equipped with a lubricant flow restrainer 23, securely lodged in the lumen at approximately the point where the funnel 21 attains its least diameter. The flow restrainer 23 is a cylindrical body having a reduced diameter outer surface zone 24 spaced from both ends and being traversed by a small axial bore 25, the size of which is related empirically to the viscosity of the lubricant to be used and to the compression of the lubricant within the funnel.

The catheter constructed as just described is loaded with a suitable quantity of lubricant (normally a gel-type material) by means of a needle inserted through the plug 22. With the clamp 26 applied proximally of the flow restrainer 23 the lubricant is forced in to fill the chamber between plug 22 and clamp 26, stretching the funnel somewhat, as indicated in FIG. 1. The total quantity of lubricant may suitably be on the order of 3 to 5cc. If desired, the funnel may be filled initially without stretching while air is permitted to escape through the lumen 19, the clamp 26 being then applied and additional lubricant forced in under pressure.

As noted above, the filled unit is autoclaved to sterilize the lubricant and the unit is then packaged and gas sterilized.

An added feature of this catheter is that it can be enclosed within a clear plastic sleeve before packaging to provide the user with a catheter which can be lubricated and administered to the patient while enclosed in a sterile sleeve from the time it is removed from the package to the time it is inserted and in place within the patient. The sleeve is removed and discarded after the catheter insertion is completed. This new procedure which is made possible by the provision of a prelubricated catheter enclosed in a plastic sleeve will reduce the incidence of infection resulting from unsterile insertion procedures and will reduce the time and extra caution now required for catheter insertion.

The catheter with the self-lubricating feature used without the sleeve offers three distinct advantages over what is currently available. First, the handling is minimized by not requiring the lubricant to be opened and placed on the catheter while trying to maintain sterile conditions. Second, the lubricated catheter can be grasped on a dry surface for insertion. Third, the amount of lubricant can be controlled, which reduces the risk of allowing excess amounts of lubricant to be pushed up into the bladder.

While an embodiment of the invention is shown and described in connection with a Foley (balloon) catheter it will be appreciated that a single lumen catheter could be made self-lubricating in the same manner by forming it with a lubrication system corresponding to the elements 19–26, the balloon system 15–18 being omitted. Although described in terms of a urinary catheter, the lubrication system could be adapted to other types of catheters wherever lubrication during insertion is recommended. With the provision of sufficient capacity in the lubricant reservoir chamber, as by enlarging the funnel 21, the pre-compression feature could be eliminated, leaving it to the operator to squeeze out the lubricant at any desired rate, but preferably still under the control of the flow restrainer. The entire catheter may be of rubber latex, formed by dipping in the usual manner, or the shaft may be an extruded plastic with separately formed rubber or plastic funnels and balloon, if any. The flow restrainer 23 is of any suitable relatively solid plastic.

It is further contemplated that the elements 19, 20, 21, 22, 26 and 23 (if needed) may be formed as a small separate lubricating cannula, inserted initially within the drainage lumen of a plain or foley catheter, with an eye (corresponding to eye 20) in register with or adjacent the drainage eye (such as 12), the lubricant being expressed through said eyes during insertion of the catheter and the lubricating cannula being thereafter removed and discarded.

What we claim is:

1. A catheter adapted for insertion into a body passage of restricted size comprising a shaft, a main lumen traversing said shaft from a point adjacent the distal tip thereof to the proximal end thereof, and an integral lubrication system including an eye close to the distal tip of the catheter, a funnel adjacent the proximal end of the catheter, a lumen connecting said funnel to said eye, a first closure for the proximal end of said funnel and a removable second closure for the distal end of said funnel, the interior of said funnel between said closures constituting a lubricant containing chamber from which lubricant may be expressed upon removal of the removable closure.

2. A catheter according to claim 1 which includes a flow restrainer in said second named lumen adjacent the connection thereof to said funnel.

3. A catheter according to claim 2 wherein the flow restrainer is a cylindrical body traversed axially by an orifice smaller than the cross-section of said lumen.

4. A catheter according to claim 1 in which the first closure is a one-way valve.

5. A catheter according to claim 4 in which the valve is a plug of self-sealing material.

6. A catheter according to claim 1 in which the second closure is a clamp.

7. A catheter according to claim 1 in which said funnel is adapted to be inflated by forcible injection of lubricant, to restrain the lubricant under pressure and to express automatically a portion of the lubricant upon removal of said second closure.

8. A catheter according to claim 1 which includes a quantity of lubricant confined in the funnel, the funnel being stretched and the lubricant being under pressure.

* * * * *